US007804997B2

(12) United States Patent
Geng et al.

(10) Patent No.: US 7,804,997 B2
(45) Date of Patent: Sep. 28, 2010

(54) METHOD AND SYSTEM FOR A THREE DIMENSIONAL FACIAL RECOGNITION SYSTEM

(75) Inventors: Zheng Jason Geng, Rockville, MD (US); David Tunnell, Palm Bay, FL (US); Pan Gao, Rockville, MD (US)

(73) Assignee: Technest Holdings, Inc., Boston, MA (US)

( * ) Notice: Subject to any disclaimer, the term of this patent is extended or adjusted under 35 U.S.C. 154(b) by 1193 days.

(21) Appl. No.: 11/150,872

(22) Filed: Jun. 10, 2005
(Under 37 CFR 1.47)

(65) Prior Publication Data
US 2006/0023923 A1 Feb. 2, 2006

Related U.S. Application Data

(60) Provisional application No. 60/578,926, filed on Jun. 10, 2004.

(51) Int. Cl.
*G06K 9/00* (2006.01)
(52) U.S. Cl. .................................. 382/154; 382/118
(58) Field of Classification Search ................ 382/154, 382/118
See application file for complete search history.

(56) References Cited

U.S. PATENT DOCUMENTS

| 5,764,790 | A * | 6/1998 | Brunelli et al. ............ 382/118 |
| 6,381,346 | B1 * | 4/2002 | Eraslan ..................... 382/118 |
| 6,556,196 | B1 * | 4/2003 | Blanz et al. ................ 382/154 |
| 7,391,402 | B2 * | 6/2008 | Lee ............................ 345/96 |
| 2003/0063778 | A1 * | 4/2003 | Rowe et al. ................ 382/115 |
| 2003/0123713 | A1 * | 7/2003 | Geng ......................... 382/154 |
| 2007/0183653 | A1 * | 8/2007 | Medioni et al. ............ 382/154 |

OTHER PUBLICATIONS

Pentland et al., View-based and modular eigenspaces for face recognition, 1994, IEEE Conference on Computer Vision and Pattern Recognition, pp. 1-7.*
Noh, Jun-yon and Ulrich Neumann, "A Survey of Facial Modeling and Expression Techniques," Integrated Media Systems Center, University of Southern California, 2000. http://graphics.usc.edu/cgit/pdf/papers/survey.pdf.
J. Atick, P. Griffin, and N. Redlich, "Statistical Approach to Shape from Shading: Reconstruction of Three-Dimensional Face Surfaces from Single Two-dimensional images," Neural Computation, vol. 8, pp. 1321-1340, 1996. http://neco.mitpress.org/cgi/content/abstract/8/6/1321.

(Continued)

*Primary Examiner*—John B Strege
(74) *Attorney, Agent, or Firm*—Steven L. Nichols; Vancott, Bagley, Cornwall & McCarthy

(57) ABSTRACT

A computer automated 3D sketch artist process for generating a computer 3D image of an individual includes the steps of generating a morphable head model as a starting point to develop a composite 3D like picture of the individual by analysis of a prerecorded data base of 3D face pictures, selecting a lighting model to best depict the individual, selecting a mouth model from a prerecorded data base of mouth shapes to best depict the individual's mouth and teeth, selecting an expression model for the individual's composite 3D sketch from a prerecorded data base of facial expressions, and manipulating the generated composite 3D sketch with various morphing tools to selectively modify the composite sketch to best conform to the individual's characteristics.

19 Claims, 19 Drawing Sheets
(15 of 19 Drawing Sheet(s) Filed in Color)

OTHER PUBLICATIONS

Blanz, V. and Romdhani, S. and Vetter, T., "Face Identification across Different Poses and Illuminations with a 3D Morphable Model" 5th Int. Conference on Automatic Face and Gesture Recognition, pp. 202-207, 2002. http://www.mpi-sb.mpg.de/~blanz/publications/fg02.pdf.

M. Lades, et. al., "Distortion Invariant Object Recognition in the Dynamic Link Architecture." IEEE Trans. Comput., vol. 42, No. 3, pp. 300-311, Mar. 1993, http://organic.usc.edu:8376/~dyweb/teaching_CS566_references.html.

* cited by examiner

METHOD AND SYSTEM FOR A THREE DIMENSIONAL FACIAL RECOGNITION SYSTEM

RELATED APPLICATION

The present application claims priority under 35 U.S.C. §119(e) from the following previously-filed Provisional patent applications, U.S. Application No. 60/578,926, filed Jun. 10, 2004 by Geng, entitled "3D Sketch Artist Software and 3D Facial Recognition System" which is incorporated herein by reference in its entirety.

BACKGROUND

Law enforcement professionals have used professional sketch artists for years to generate a composite of a suspect's face from a witness's description. However, many police departments are unable to staff the high-level of skill necessary to make this important police function effective. Industry has answered with a variety of software tools to create composites of suspects from witness descriptions. Yet, all existing sketch artist tools and software are limited by two dimensional (2D) techniques to render a three dimensional (3D) object, the human face. Furthermore, these existing tools can only sketch "standard" frontal faces, while in most cases, witness' impressions of suspects are from side views. In addition, there is no coherent integration of the sketch-art facial drawing with advanced 3D facial recognition technology.

SUMMARY

In one of many possible embodiments, the present system and method provides a computer automated 3D sketch artist process for generating a computer 3D image of an individual including the steps of generating a morphable head model as a starting point to develop a composite 3D like picture of said individual by analysis of a prerecorded data base of 3D face pictures, selecting a lighting model to best depict the individual, selecting a mouth model from a prerecorded data base of mouth shapes to best depict the individual's mouth and teeth, selecting an expression model for the individual's composite 3D sketch from a prerecorded data base of facial expressions, and manipulating the generated composite 3D sketch with various morphing tools to selectively modify the composite sketch to best conform to the individual's characteristics.

Another embodiment of the present system and method provides an automated computer program to facilitate sketching a facial 3D image including the steps of utilizing a crime witness's interview data to generate a first sketch of a 3D face of an individual based upon eigenfeatures including, but not limited to, race, sex, hairstyle, estimated age or weight from a prerecorded data base of facial images, selectively modifying the first sketch of the individual utilizing prerecorded eigenfeatures on the face of the first sketch utilizing prerecorded facial features including, but not limited to, a nose, a mouth, a chin, or hair into the first sketch, selectively modifying the first sketch utilizing prerecorded eigenfeatures to incorporate selected eigenfeatures to more exactly incorporate the crime witness's observations.

BRIEF DESCRIPTION OF THE DRAWINGS

The accompanying drawings illustrate various embodiments of the present system and method and are a part of the specification. The illustrated embodiments are merely examples of the present system and method and do not limit the scope of the system and method. The patent or application file contains at least one drawing executed in color. Copies of this patent or patent application publication with color drawing(s) will be provided by the Office upon request and payment of the necessary fee.

DETAILED DESCRIPTION

Figure 1:
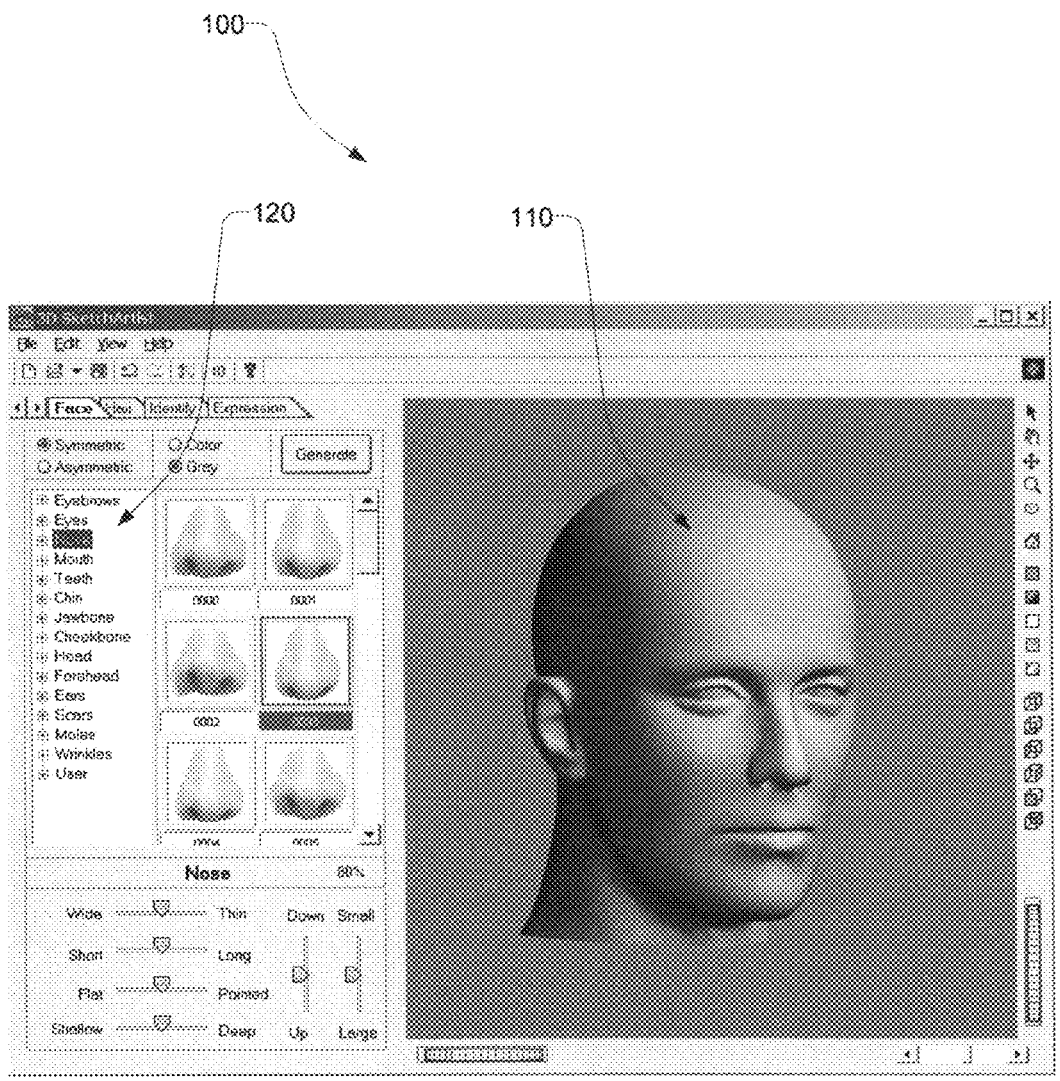
FIG. 1 is an illustration of a screen shot of a user interface of a three dimensional sketch artist software process according to one exemplary embodiment.

The present specification discloses a method and system for a three dimensional facial recognition system. More specifically, the present specification discloses a method for generating a computer automated 3D sketch artist process for generating a computer 3D like picture of crime suspects from witness descriptions.

In the following description, for purposes of explanation, numerous specific details are set forth in order to provide a thorough understanding of the present system and method for providing a three dimensional facial recognition system. It will be apparent, however, to one skilled in the art, that the present method may be practiced without these specific details. Reference in the specification to "one embodiment" or "an embodiment" means that a particular feature, structure, or characteristic described in connection with the embodiment is included in at least one embodiment. The appearance of the phrase "in one embodiment" in various places in the specification are not necessarily all referring to the same embodiment.

Genex Technologies, Inc. (Genex), a 3D imaging and 360° intelligent surveillance company focused on innovations in imaging, proposes a novel 3D facial composition tool, dubbed as the "3D SketchArtist™", to help the United State's effort in fighting the war on terror and, in general, criminal activity. This unique technology and the resulting product could provide law enforcement professionals with a simple, easy-to-use 3D software tool, for the first time, used to sketch realistic composites of a human face in its true natural shape in three dimensional (3D) form. The realistic digital 3D sketch drawings of terrorists or criminal suspects can then be sent out to many state and local police departments and Federal Bureau of Investigation (FBI) field offices to improve the efficiency, accuracy, and speed of the criminal investigations and captures.

The 3D sketch artist system will provide a simple and user-friendly means of generating a human face using local eigenfeatures. This approach will allow users to quickly create a composite and morph that composite with powerful 3D morphing technology. Through consultations with law enforcement professionals, they are excited at the capability to change virtually any feature of a face quickly and accurately using a simple, intuitive graphical interface. Using this novel 3D tool, a novice with minimal training can perform tasks in minutes that currently take experts several hours.

Furthermore, law enforcement professionals have, for the first time, a 3D means of changing the pose of the individual to provide profile and other angled views of a face. Even expressions and lighting can be changed.

The 3D sketch artist tool is able to virtually open the mouth and detail the teeth of an individual. The 3D sketch artist tool is also able to virtually style individual's hair in 3D fashion.

Integrated with 3D facial recognition technology, the resultant comprehensive software application will provide law enforcement professionals with a new generation of 3D tools to create a composite and even perform a match of the composite against a database of known mug shots, either the current 2D mug shots or the newer 3D mug shots which are quickly becoming available.

The overall 3D sketch artist development has three primary purposes. The first purpose is to provide a simple, intuitive, and flexible tool to create a composite of an individual that more closely resembles the actual suspect in three dimensions, with pose, lighting, and expression variation, and that can be performed by a novice.

The second purpose is to provide a means to simulate the age progression in a predictive manner with scientific basis.

The third purpose is to provide a 3D platform to perform 3D facial recognition based on the sketched faces.

Time is a well-known enemy in law enforcement. The more time that passes between the actual crime and when a sketch of a subject is made from a description is critical. Thus, a key goal of this development is to place an easy-to-use tool in the hands of a minimally trained novice to quickly render a description of an individual using 3D techniques for intuitive simplicity, accuracy, and realism.

FIG. 1 is an illustration of a screen shot of a user interface of a three dimensional sketch artist software process according to one exemplary embodiment. The first user interface (100) allows the user to begin at a blank head model (110). The sketch artist software can provide several different software modules (120) to choose from, including, but not exhaustive of eyebrows, eyes, nose, mouth, teeth, chin, jawbone, cheekbone, head, forehead, ears, scares, moles, or wrinkles. The user can then apply these several modules to the blank head model.

Figure 2:
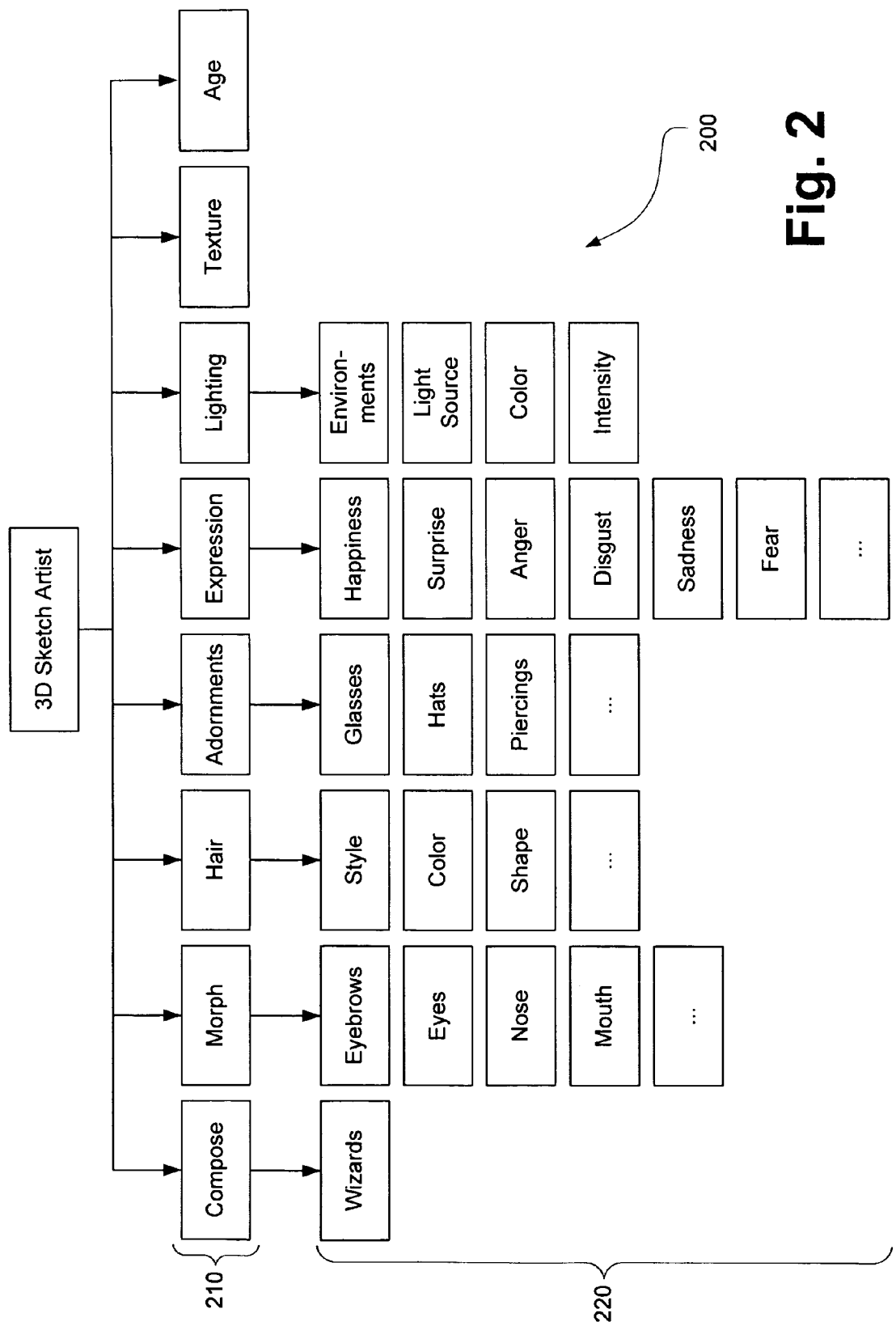
FIG. 2 is a block diagram depicting various variable software modules according to one exemplary embodiment.

FIG. 2 is a block diagram (200) depicting some possible modules (210) according to one exemplary embodiment. The modules (210) can be altered according to any possible submodules (220) listed under those modules (210). The detailed development strategy that implements these modules will be given in the following sections of this description.

The 3D sketch artist morphing tool and 3D software platform can have numerous other applications, such as surveillance programs similar to the Amber alert program, child age progression, test database generation for facial recognition, AnthroImaging, general facial recognition (aging of images and photographs), Personal Digital Assistant (PDA) portable face sketching, gaming, Hollywood or Disney animation, and education.

The following describes the specific goals and objectives of the present 3D sketch artist development:

Technical Objectives

Several technical challenges face the development of a 3D sketch artist software tool that renders realistic 3D face images quickly, easily, and accurately. These challenges include developing a morphable face model from unique 3D local eigenfeatures. The development of this morphable face model is a novel approach that can provide computational speed for an average personal computer (PC), PDA or other computing device.

A second challenge is developing an inventory of eigenfeatures (eyes, noses, lips, etc.) for use in building 3D composite faces. This can be tedious and involves a user sitting at a display terminal and "cutting out" local eigenfeatures from real 3D faces. This 3D sketch artist software tool can be used to automatically excise eigenfeatures based on alignment to an average head so that the database of eigenfeatures can be built quickly and effectively.

A third challenge is identifying seamless 3D blending methods. Conjoining and blending 3D surfaces is not as simple as pasting a nose/mouth onto a 2D composite sketch. 3D "pasting" is more critical since lighting can greatly amplify the visibility of small surface irregularities along splicing contours. Since technical literature is not abundant with techniques for 3D surface splicing, a novel method to achieve seamless 3D blending must be developed.

A fourth challenge is being able to provide life-like texture brush capabilities. The ability to change the color and shading of each local eigenfeature by proper texture and shape blending with adjacent local eigenfeatures is necessary for realism.

A fifth challenge is to render life-like 3D hair. The development of 3D hair, especially facial hair, which can grow, be trimmed and styled quickly and realistically, is a significant technical challenge. Hair has been one complaint of current composite tools from discussions with law enforcement agencies that create sketches on a regular basis.

A sixth challenge is being able to render realistic 3D accessories. Realistic 3D hats, glasses, and other decorations are needed to in order to make the 3D sketch artist tool complete. Research is needed to make these 3D models look realistic. Techniques from computer graphics currently allow realistic rendering of metal, translucency, cloth, and reflective surfaces.

Achieving each of the above listed challenges can provide an excellent basis for how best to implement a 3D sketch artist tool. Architecture that serves as the foundation for each of these objectives has already been developed. Several module developments, including a generic morphable head model, a novel lighting model, a generic mouth model, expression models, and various asymmetric and symmetric morphing tools have also been completed.

3D sketch artist architecture can provide a comprehensive platform to achieve these objectives. The architecture and approach to overcoming these challenges will now be discussed.

Figure 3:
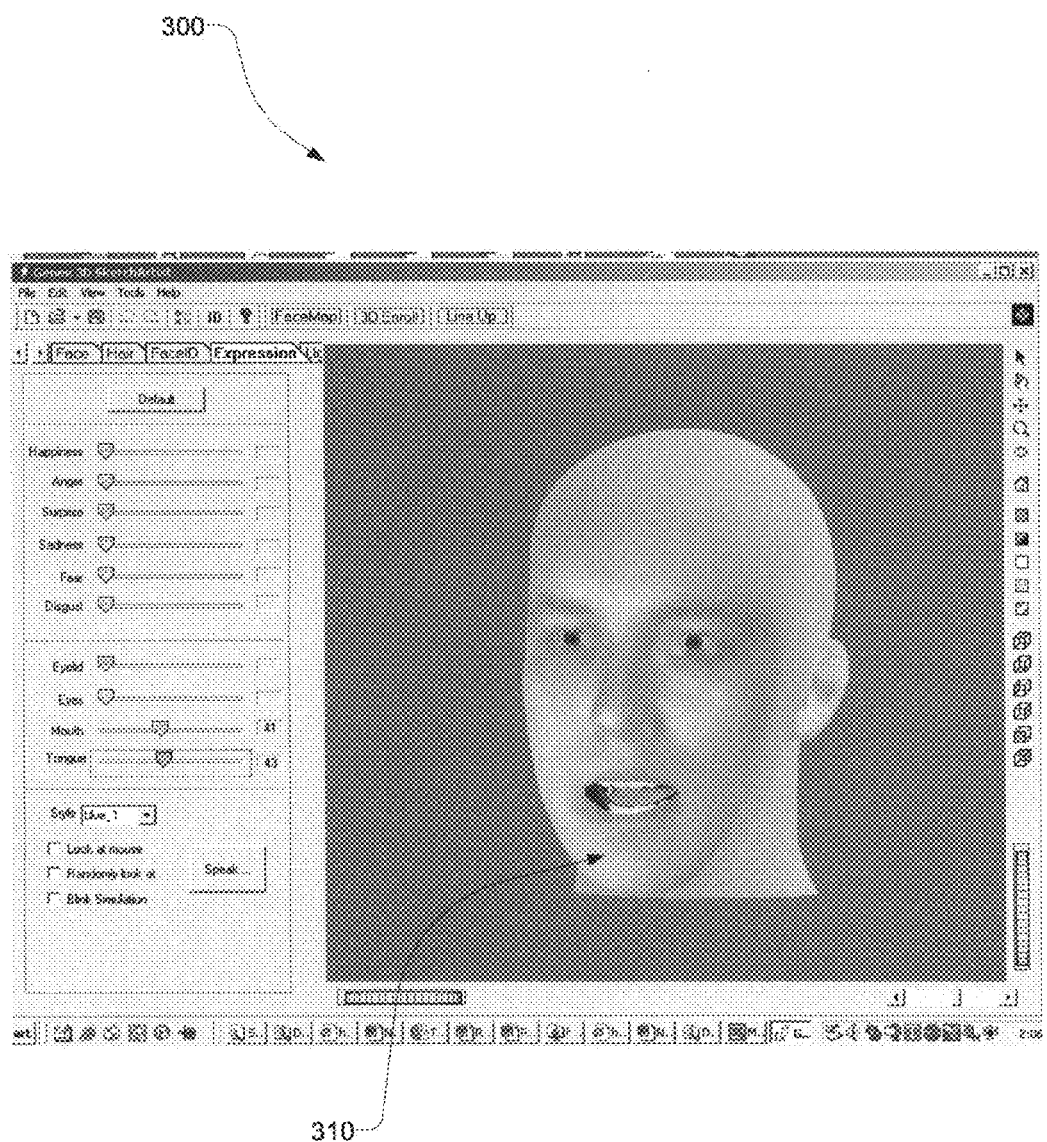
FIG. 3 is another illustration of a screen shot of a user interface of a three dimensional sketch artist software process according to one exemplary embodiment.

FIG. 3 is another illustration of a screen shot of a user interface of a three dimensional sketch artist software process according to one exemplary embodiment. The open mouth model (310) is shown in a second user interface (300). The open mouth model (310) can be used to sketch particular features of an individual's teeth and mouth area. Missing and misaligned teeth are a chief complaint from sketch artists and are currently difficult to perform in 2D, since the mouth cannot be opened as with a 3D model. The present system and method's approach is to extend the method of opening a mouth and allowing a user to change the size, shape, texture, position, and color of the teeth, in 3D and 2D texture overlays.

In order to begin explaining 3D face modeling, a brief background is helpful in understanding this art. Quite a bit of research has been performed in the area of facial modeling dating back to 1972 with Frederick I. Parke, who performed pioneering work in the area of realistic modeling of the face. Since that time, numerous approaches have been attempted to obtain realistic facial modeling. The most recent research can be summarized by an excellent paper from Jun-yong Noh and Ulrich Neumann from the Integrated Media Systems Center at the University of Southern California entitled, "A Survey of Facial Modeling and Expression Techniques." This survey details many of the most-common methods of facial modeling used today. The following are a few of these approaches.

Interpolation is a primitive method of specifying smooth motion across two key frames at extreme positions from one another, over a normalized interval, resulting in a limited range of motion.

Unlike interpolation, parameterizations specify parameters of the face to provide a wide range of expression variation with relatively efficient computation. The drawbacks of this method include tedious manual manipulation of parameters and conflicts between parameters affecting the realism of the expression across specific vertices.

Face Action Coding System (FACS), a very promising method to perform expressions based on the facial muscles from facial anatomy analysis, defines or codes specific facial muscles and their movement in order to generate realistic expressions that overcome the lighting and correspondence limitations of other methods. Pseudo-muscle models mimic the dynamics of the human tissue with heuristic geometric transformations while physical muscle models mathematically describe the behavior of the skin, bone and muscle.

The spring mesh muscle method applies elastic meshes through the muscles in 38 interconnected "spring networks" of the facial structure.

Vector muscle movements are defined by vector field direction, origin, and insertion point using this muscle-modeling method. The sphincter muscles are represented by a simplified parametric ellipsoid. This method is limited with no automatic means of placing muscles beneath a specific mesh, and is wrought with a trial and error process to generate performance. It was used in the film 'Tiny Toy' to generate expressions.

Free Form Deformation (FFD) defines a set of control points, and then changes one or several control points. Then a kind of spline function is used to recalculate the model. This method is mainly used for the computer modeling field and is very complex and slow.

The spline pseudo muscles method offers a solution to the issue of lack of smooth deformation of fixed polygonal models by supporting smooth, flexible deformation using spline muscle models. This method is also computationally efficient if implemented with affine transforms for localized control points.

Texture manipulation is another method of facial modeling used today. There are various methods for manipulating the texture including, but not limited to, control of shading, color, use of lighting models, homotopy, weight maps, etc. Some methods are more computationally demanding than other methods. A lighting model included in 3D sketch artist is very effective for manipulating the effects caused by pose and lighting onto a 3D face. However, much work is needed to manipulate texture blending. Thus, a texture brush for the 3D sketch artist has been included.

Bilinear interpolation, scattered data interpolation, automatic correspondence points detection, and anthropometry are methods based upon the assumption that a large variety of faces can be represented from variations of a single model. The models are constructed from a best-fit method. However, as with most best-fit models, these methods are limited in their performance. Included in 3D sketch artist software is a best-fit method based upon key features and an eigenface database. Several feature points are moved and a recalculation of the best-fit face using an SVD algorithm is performed. This method has shown to be slow, complex, and dependant upon a large database.

The present innovative approach is based upon 3D local eigenfeature analysis using proven principle component analysis (PCA) techniques. In order to achieve a 3D composite tool that is realistic, flexible, and computationally acceptable for a common PC platform, the limitations of many of the current methods of face morphing described above must be overcome. The result can be a computationally efficient method of changing a face that is ideal to render 3D composites quickly and accurately.

The technical design and approach for the present 3D sketch artist development will now be discussed.

The following are the research tasks that must be technically overcome in order to render realistic 3D face images quickly, easily, and accurately: develop morphable 3D local eigenfeatures, develop interactive and automated tools for excising eigenfeatures, develop seamless 3D blending methods, develop a brush for texture and skin tone manipulation, develop life-like 3D hair, and develop realistic 3D accessories.

Each of these research tasks is very technically challenging. The present architecture and concept of operation (CONOP) for the graphical user interface (GUI) will now be described.

3D Sketch Artist Architecture 3D sketch artist architecture has already been developed and serves as the foundation for each of the above-listed tasks. The present architecture is based upon development of a 3D face space, which is derived from applying a unique algorithm similar to PCA analysis to a database of 3D faces. Successful extensions of the present 3D eigenhead model to span the variations among the general population, and a method to fit a face to a head model using a best-fit method have been developed. Using well-founded PCA-like techniques, the present system and method extends this architecture to build spaces for local eigenfeatures. Local eigenfeature spaces allow automatic generation of random eyes, nose, lips, etc. for suggesting variations of the face description. This architecture enables a user to quickly morph a face to perform actions such as expressions as shown in FIG. 4 and FIGS. 5A through 5F.

Figure 4:
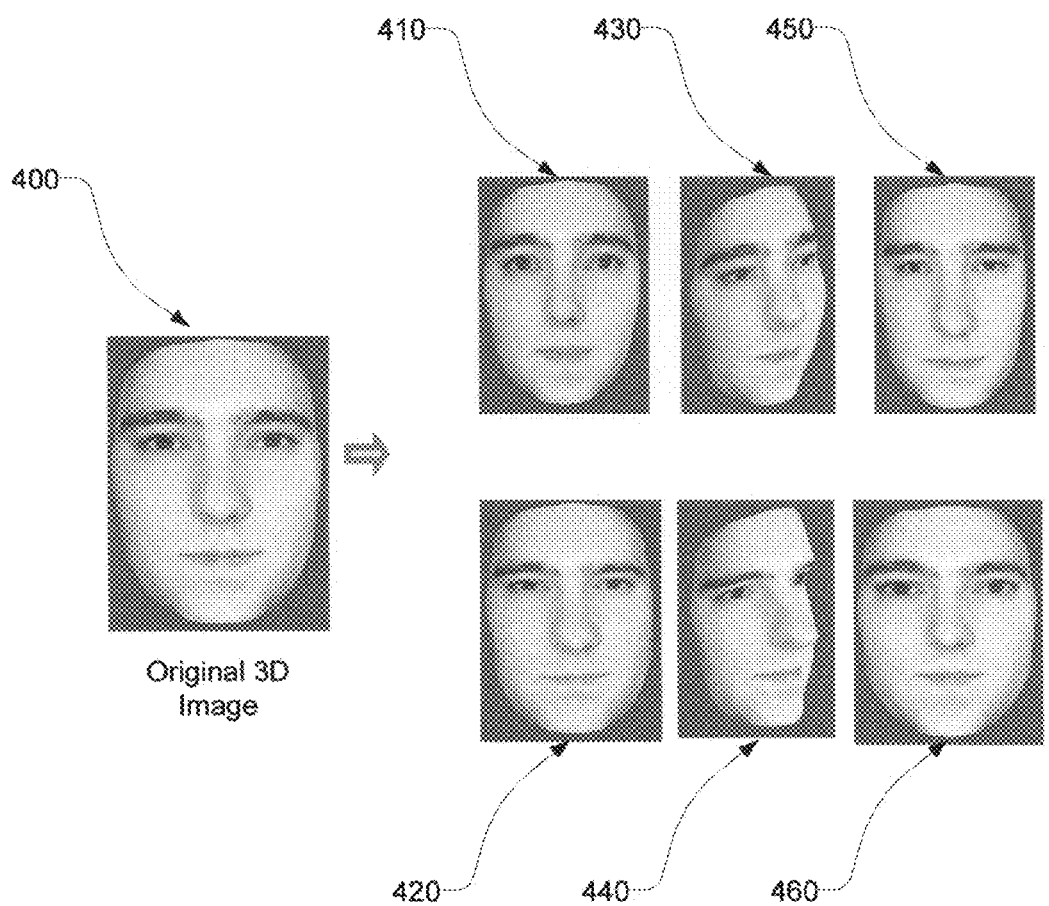
FIG. 4 is an illustration of examples of morphing an original 3D image according to one exemplary embodiment.
Figure 5:
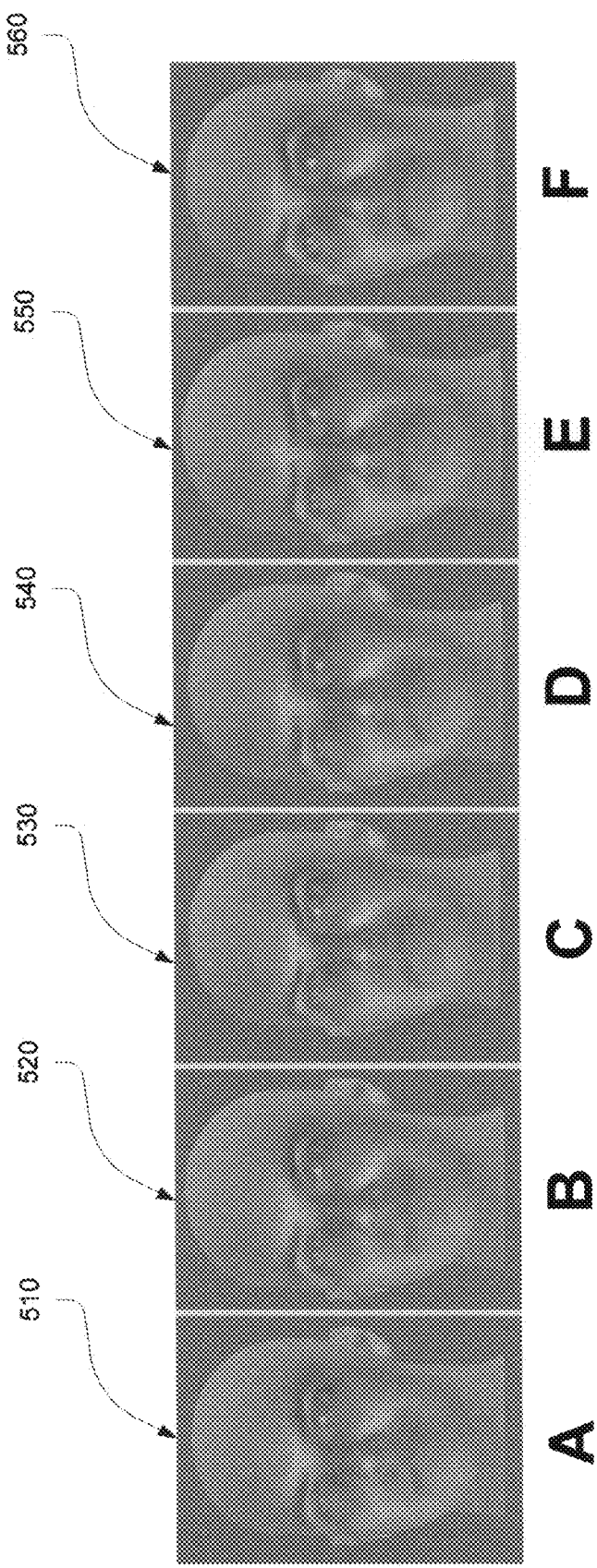
FIG. 5 is an illustration depicting examples of morphing a 3D image in order to show expressions according to one exemplary embodiment.

FIG. 4 is an illustration of examples of morphing an original 3D image (400) according to one exemplary embodiment. The original 3D image (400) can be morphed to form different types of faces. These faces can include, but are not limited to a female face (410), a male face (420), an Asian face (430), a European face (440), a thin face (450), or a fat face (460).

FIGS. 5A through 5F are illustrations depicting examples of morphing a 3D image in order to show expressions according to one exemplary embodiment. An original 3D image can be morphed to form different expressions including, but not limited to a normal expression (510), a happy expression (520), an angry expression (530), a sad expression (540), a disgusted expression (550), or a surprised expression (560).

This architecture provides an excellent framework for 3D sketch artist development, and reduces the risks associated with its development. Thus, this development is now certainly achievable using this architecture as a foundation.

Concept of Operation

The concept of operation for the 3D sketch artist follows a simple, step-by-step process that allows a user to quickly sketch a face in 3D using a variety of extremely intuitive methods as follows.

Figure 6:
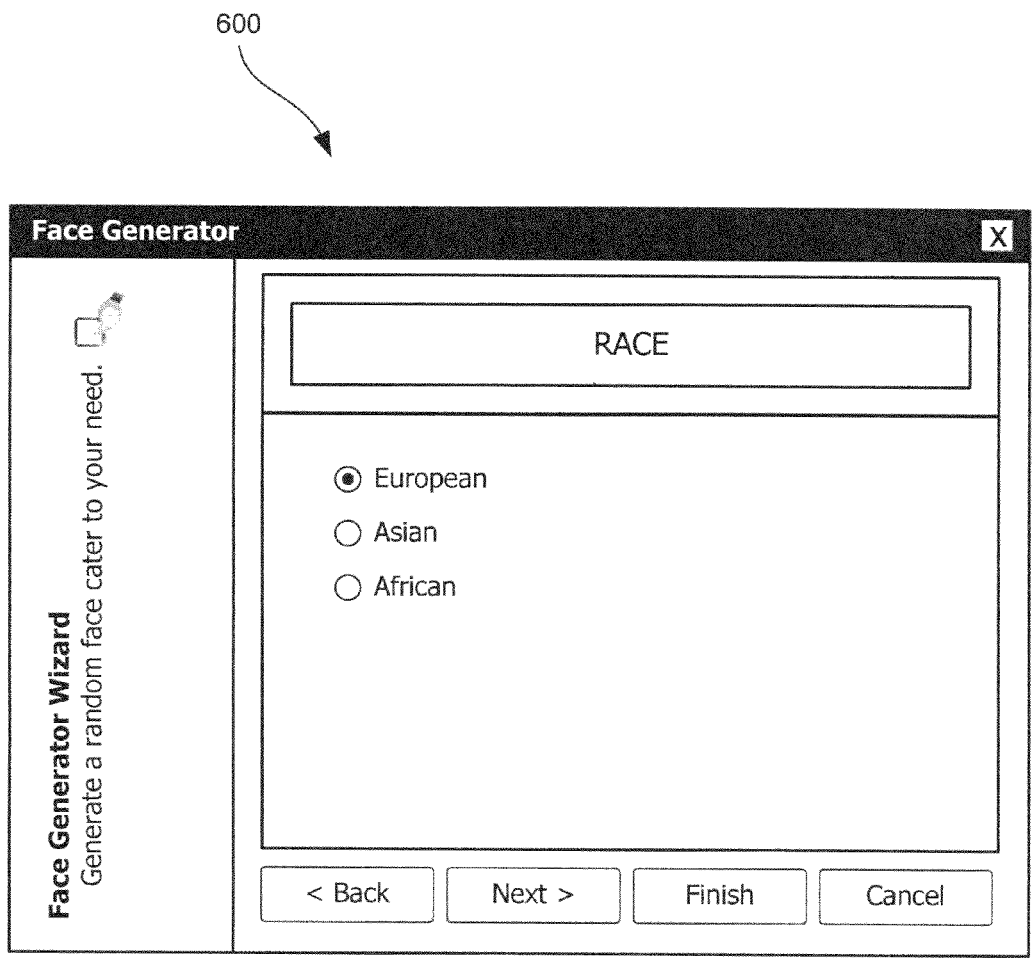
FIG. 6 is yet another illustration of a screen shot of a user interface of a three dimensional sketch artist software process depicting a face generator wizard according to one exemplary embodiment.

First, the user can start by answering a questionnaire via a wizard that follows a classical witness interview to describe the face of the suspect. The goal is for the 3D sketch artist to render a face that is close to the description as a starting point. Alternatively, a user can simply select each eigenfeature one-by-one without using the optional wizard. Questions can include but are not limited to race, sex, hair style, age, or weight. FIG. 6 is yet another illustration of a screen shot of a user interface of a three dimensional sketch artist software process depicting a face generator wizard according to one exemplary embodiment. The face generator wizard (600) allows the user to choose a more general description of a suspect, for example, before rendering more specific details.

Figure 7:
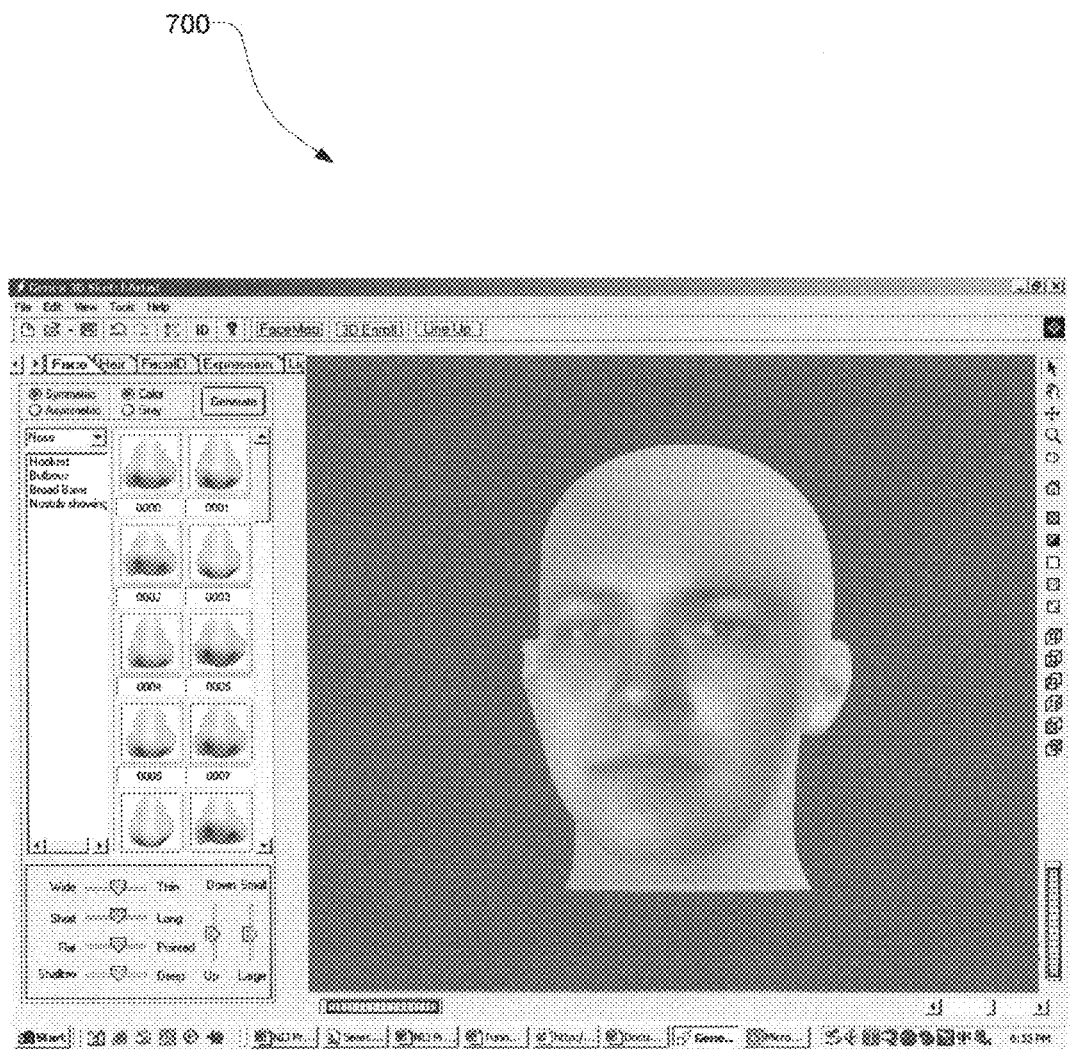
FIG. 7 is yet another illustration of a screen shot of a user interface of a three dimensional sketch artist software process depicting an example eigenfeature being applied to a sketch according to one exemplary embodiment.

Secondly, a user can then select any local eigenfeature by simply clicking on the feature on the face model and selecting the desired new feature shape from a list of 3D eigenfeatures. For example, a user can select a nose and select a different eigen-nose very quickly using a pull-down menu. Or, a user can simply scroll through all of the noses using the keypad to quickly morph the nose on the face and select the nose that most closely resembles the recollection of the witness. FIG. 7 is yet another illustration of a screen shot of a user interface of a three dimensional sketch artist software process depicting an example eigenfeature being applied to a sketch according to one exemplary embodiment. The eigenfeature user interface (700) allows the user to select specific facial features that most closely match those features of a suspect, for example.

Figure 8:
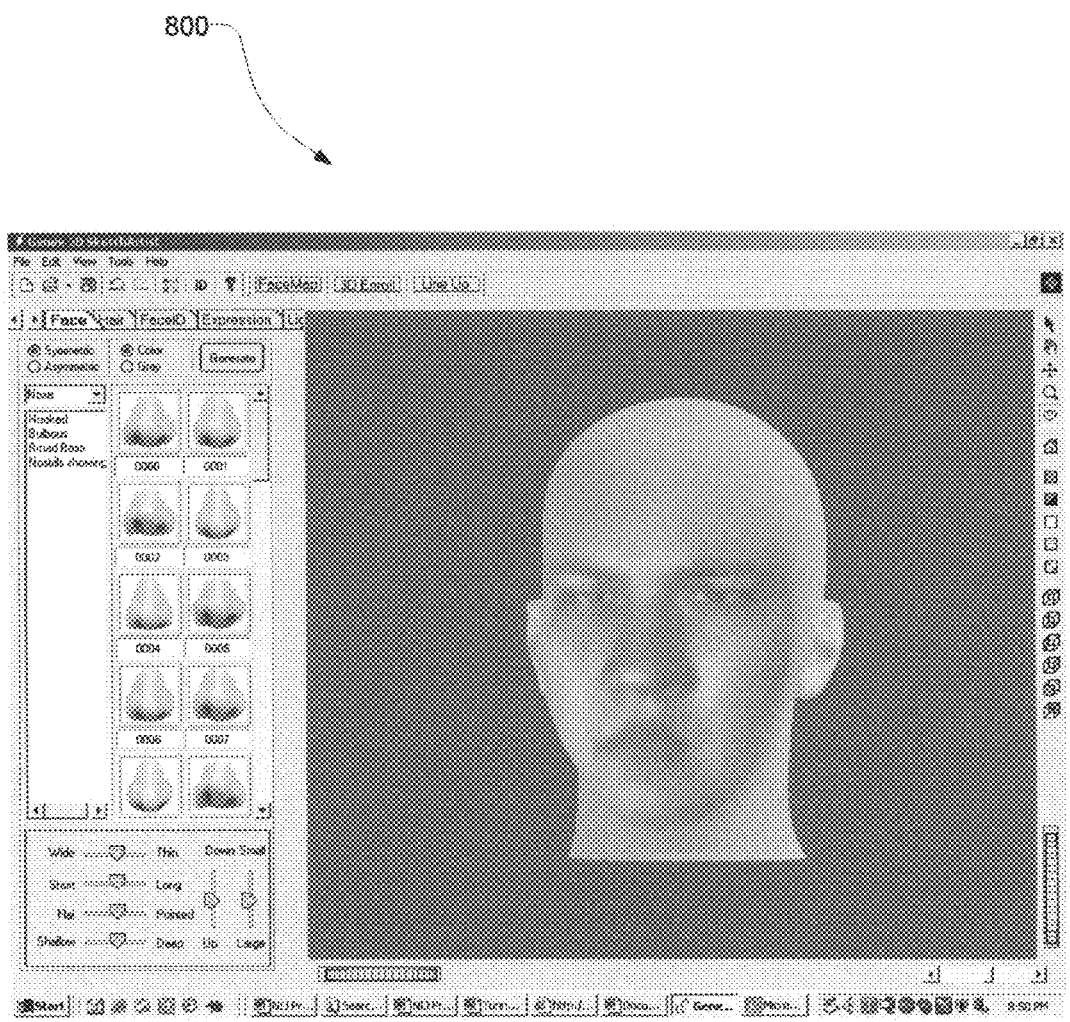
FIG. 8 is yet another illustration of a screen shot of a user interface of three dimensional sketch artist software depicting the morphing of an eigenfeature applied to a sketch according to one exemplary embodiment.

Thirdly, once the user has selected the desired eigenfeatures, more fine-tuning might be desired to make the sketch more exact. This fine-tuning can be performed quickly and easily using 3D morphing tools that enable the user to simply click on a local eigenfeature's grab point, and, by moving the mouse to the left, right, up, or down, morph the eigenfeature to provide the desired view. Other parameters including, but not limited to color, lighting, or expression can also be modified in a simple, intuitive manner. FIG. 8 is yet another illustration of a screen shot of a user interface of three dimensional sketch artist software depicting the morphing of an eigenfeature applied to a sketch according to one exemplary embodiment. The morphing user interface (800) allows the user to morph specific eigenfeatures to more closely fit the exact description of a suspect, for example.

Figure 9:
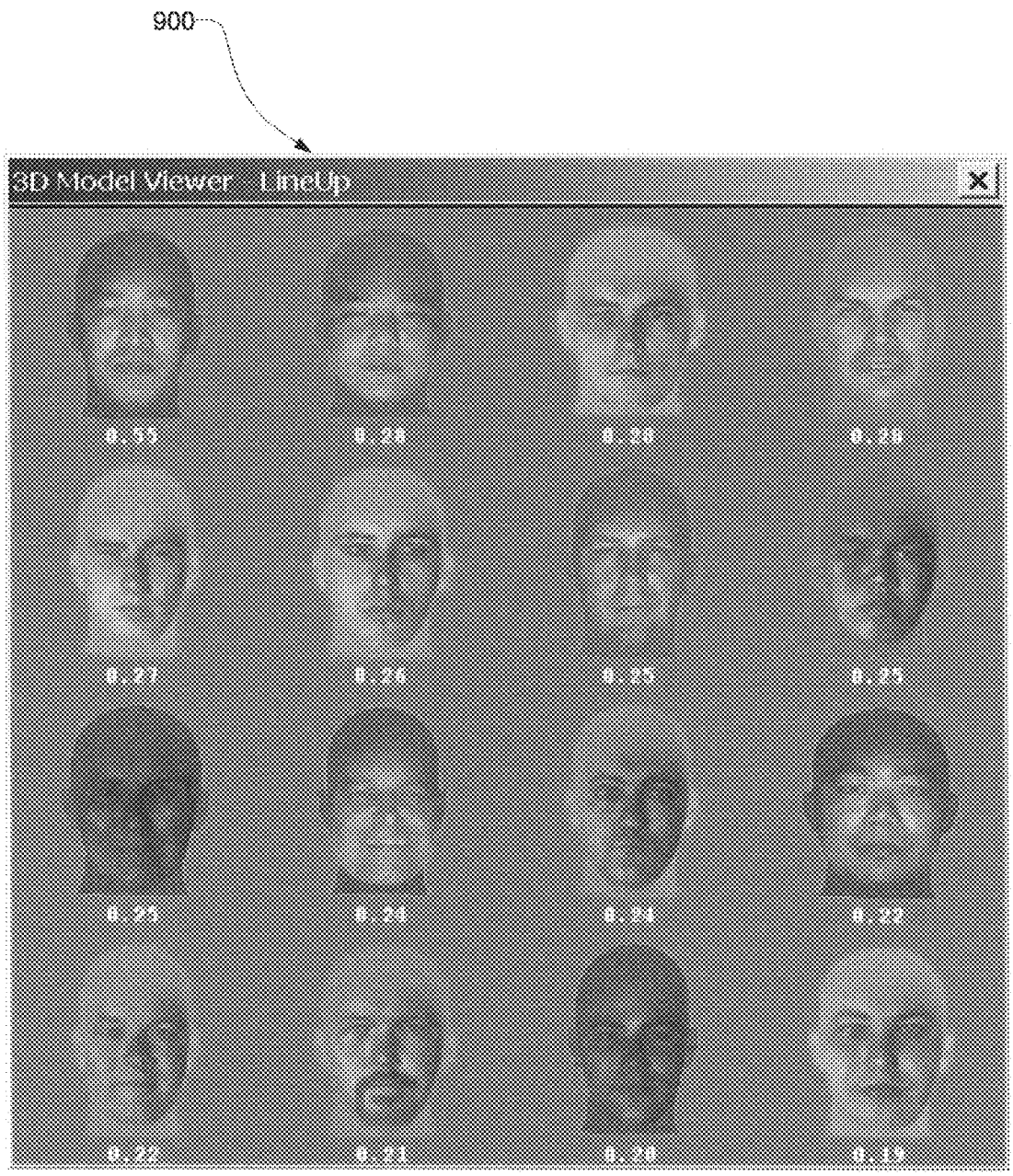
FIG. 9 is yet another illustration of a screen shot of a user interface of a three dimensional sketch artist software process depicting an example mug shot lineup according to one exemplary embodiment.

Fourth, once the face sketch is complete, it can be matched to existing mug shots using 2D and/or 3D facial recognition techniques that allow the witness to choose the suspect from a lineup of mug shots belonging to previous criminal offenders, for example. FIG. 9 is yet another illustration of a screen shot of a user interface of a three dimensional sketch artist software process depicting an example mug shot lineup according to one exemplary embodiment. The lineup interface (900) allows a victim, for example, to pick a suspect, for example, out of a group of 2D and/or 3D mug shots. Through the application of these several interfaces, a victim, for example, may be able to better describe a suspect to a user of the present system and method. This can lead to a more accurate sketch of a suspect, for example, and allow the victim to more easily choose the suspect out of a lineup.

The challenges to developing a user-friendly composite sketching tool in 3D are realism and speed. In order for a user to manipulate the 3D data in real-time on a standard computer, some innovations in how 3D and 2D texture overlay data must be achieved. As discussed previously, there exist various potential methods for 3D facial morphing. The present system and method uses an innovative method of morphing both 3D and 2D texture data that overcomes the competing limitations of realism versus speed. The present method is to utilize local eigenfeatures as morphable models created from a statistical data set of 3D eigenfeatures called feature space. A different feature space is created for each eigenfeature using a technique similar to principle component analysis (PCA). From statistical feature space, two achievements are gained.

The first achievement is a morphable model that is simple to change in virtually any direction, since each of the voxels and pixels are correlated or grouped with one another in a computationally efficient manner.

The second achievement is a subset of morphable eigenfeatures that represent the extreme cases of the variances in features among the data set or general population, for example.

A data based method to define start and end data is then utilized, ensuring that all of the data has the same topology:

$$\text{New\_}A = A + c^*(\text{End} - \text{Start})$$

Figure 10:
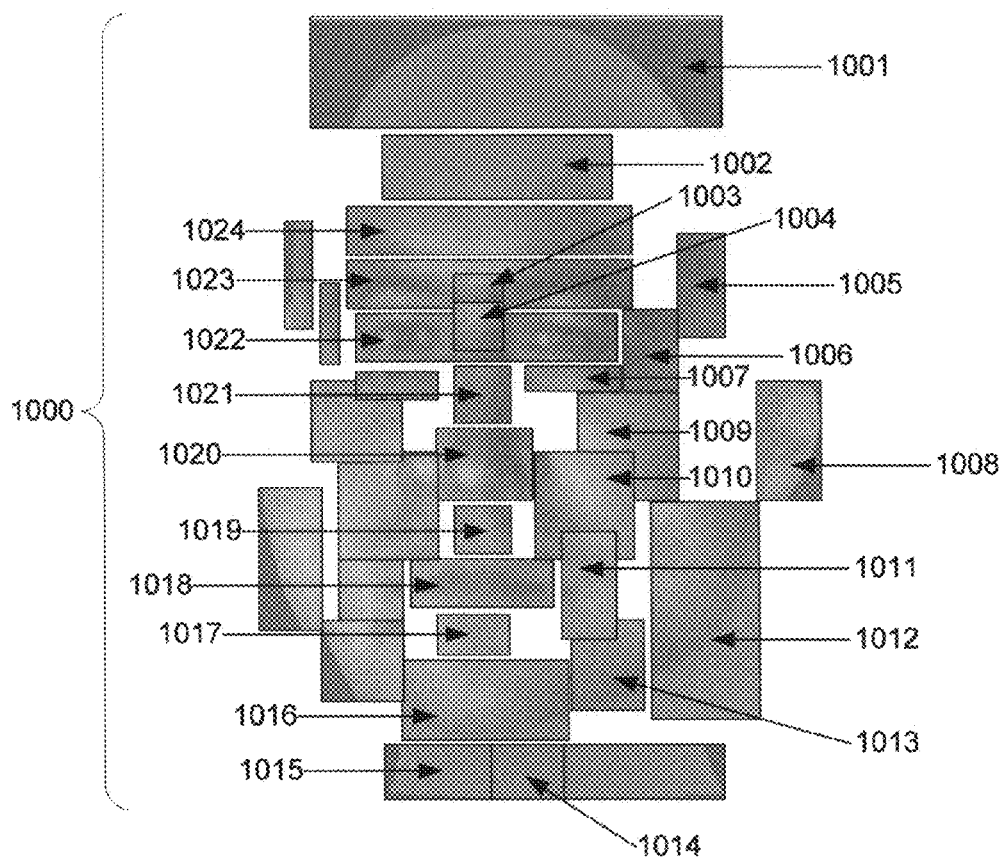
FIG. 10 is an illustration of how a three dimensional sketch artist software process defines local eigenfeatures according to one exemplary embodiment.

The present method results in a fast and very simple technique for facial morphing but requires more off-line data creation and operation action definition. However, once a local eigenfeature is fully defined, almost any morphing action can be performed using the present method. This facilitates maximum flexibility in an intuitive graphical user interface. FIG. 10 is an illustration of how a three dimensional sketch artist software process defines local eigenfeatures (1000) according to one exemplary embodiment. In FIG. 10, several local eigenfeatures (1000) are separated into different sections of an image. Although rectangles are used in this example, it is understood that any geometric shape may be used including, but not limited to, squares, circles, triangles, or ellipses. The different local eigenfeatures (1000) may include, but are not limited to, the frontal skull (1001), the forehead (1002), the glabella (1003), the nasion (1004), the temple (1005), the sphenoid (1006), the eye bags (1007), the ear (1008), the cheekbone (1009), the cheek lines (1010), the smile lines (1011), the jaw bone (1012), the jaw lines (1013), the Adam's apple (1014), the neck (1015), the chin (1016), the mentolabial furrow (1017), the mouth (1018), the philtrum (1019), the nose (1020), the nose bridge (1021), the eyes (1022), the eyebrows (1023) or the superciliary arches (1024).

Each local eigenfeature (1000) is blended in both 3D and 2D texture so that the overall face model is preserved. In addition, symmetric and asymmetric morphing is achieved by establishing certain rules between local eigenfeatures (1000) that dictate the relationship of morphing between certain specified eigenfeatures.

Figure 11:
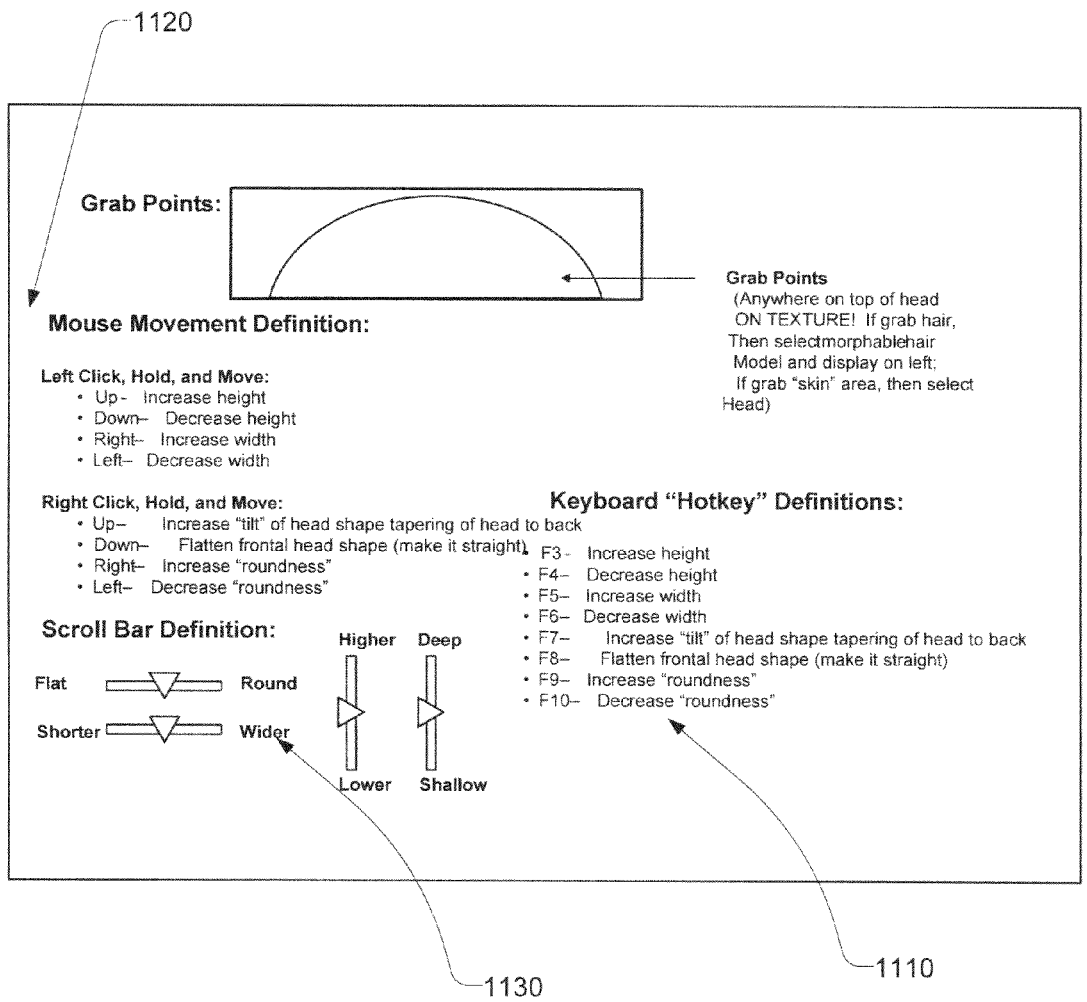
FIG. 11 is yet another illustration of a screen shot of a user interface of a three dimensional sketch artist software process depicting how a user can manipulate each local eigenfeature according to one exemplary embodiment.

FIG. 11 is an illustration of a screen shot of a user interface of a three dimensional sketch artist software process depicting how a user can manipulate each local eigenfeature according to one exemplary embodiment. A user may manipulate each local eigenfeature using several methods including, but not limited to, keystrokes (1110), mouse direction (1120), or GUI component toolbars (1130).

Developing Interactive and Automated Tools for Excising Eigenfeatures

Developing an inventory of eigenfeatures for use in building 3D composite faces can be tedious. This involves a user sitting at a display terminal and excising local eigenfeatures from real 3D faces. An automatic technique for excising eigenfeatures based on alignment to an average head model will now be described.

One critical issue in applying the 3D eigenhead approach and building 3D head space is establishing correspondence among multiple 3D face images. Representative approaches in previous attempts include Atick, Griffin and Redlich "Statistical Approach to Shape from Shading: Reconstruction of 3D Face Surfaces from Single 3D Images, Neural Computation, 1996, and Blanz, Romdhani and Vetter "Face Identification across different poses and illumination with 3D morphable model, FG2002." Their methods rely upon an optical flow approach. Computational efficiency through these previous methods has proved to be very low (45 minutes per image, as reported in FG2002) and real-time implementation for 3D face image acquisition is impossible.

The present system and method utilizes a new method of normalization and establishing correspondence among 3D face images based on geometric projection and deformation methods. The present system and method applies the known relationship between feature points on the generic model and each 3D face image to perform a geometric deformation of the generic model to fit each 3D face. The deformed generic model can represent the shape of the fitted 3D face.

Cutting contours surrounding each respective eigenfeature located on the generic model are transformed through the deformation function to locations on the target 3D face. Each eigenfeature on the target 3D face is then excised along the respective contour. An inventory of eigenfeatures can thus be built automatically, efficiently, and consistently.

Figure 12B:
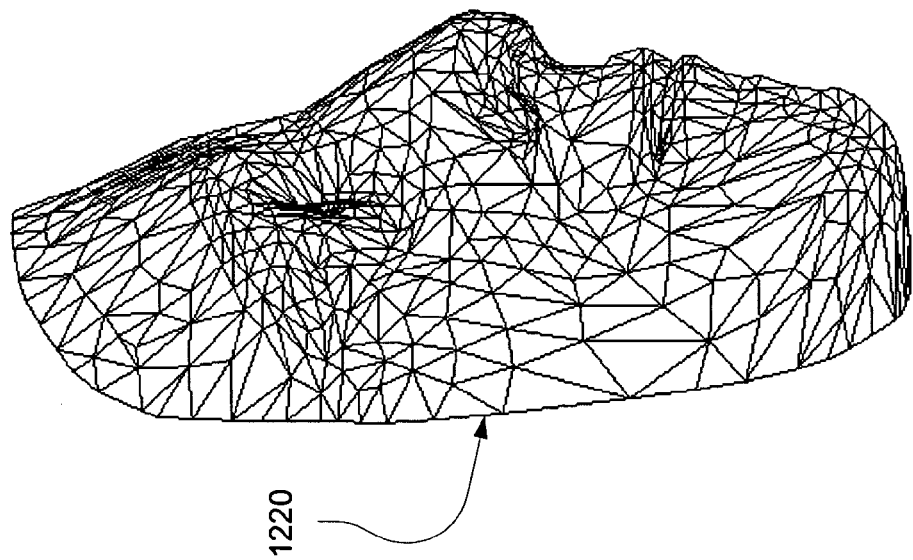
FIGS. 12A through 12B are illustrations of a three dimensional sketch artist software generic 3D face model according to one exemplary embodiment.
Figure 12A:
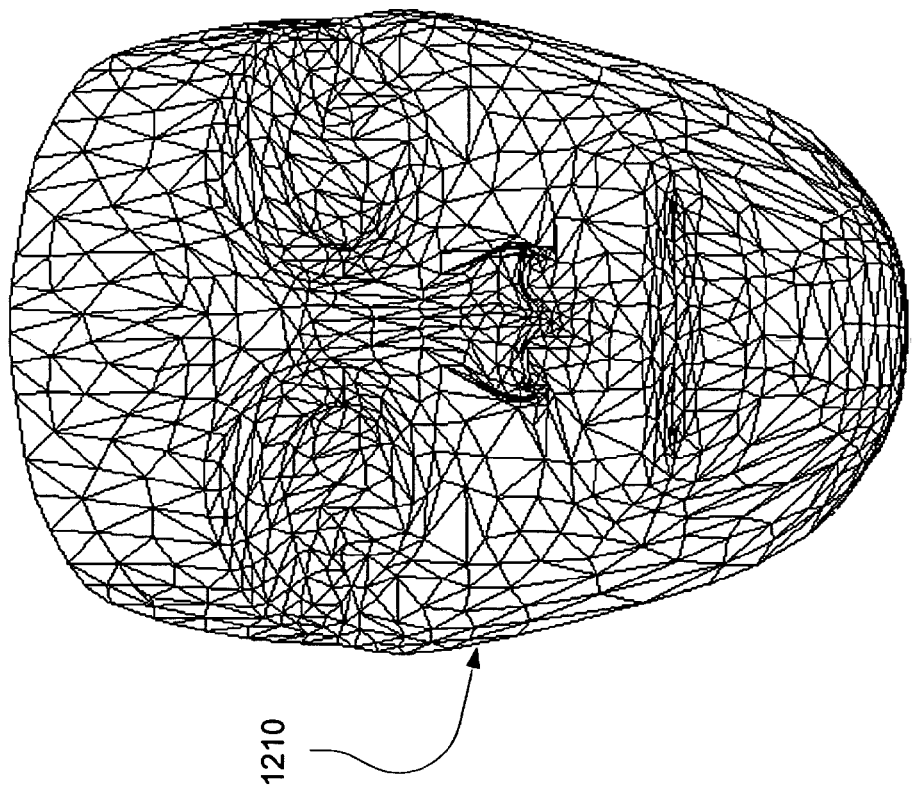

The normalization procedure for 3D face images in the database begins with pre-processing the 3D face images. This can include eliminating extraneous 3D data points in regions of the 3D face images. Feature points on each 3D face image are then defined and contours on generic model are spliced. Next, generic models are then deformed to fit the shape of 3D face images. Deformed generic models are then normalized using locations of two eyes, nose tip, and two mouth corners, for example. The normalized deformed generic head models are then ready for use for 3D Eigenhead and Head Space. For example, the average 3D head can be found by adding coordinates of the vertex of all heads. FIGS. 12A through 12B are illustrations of a three dimensional sketch artist software generic 3D face models according to one exemplary embodiment. A frontal 3D face model (1210) and a side 3D face model (1220) are shown. Both the frontal 3D face model (1210) and a side 3D face model (1220) where rendered using the normalization procedure described above.

The present system and method establishes a set of fiducial points:

$$F_i(x_i, y_i, z_i), i=1, 2, \ldots, n$$

Figures 13A, 13B:
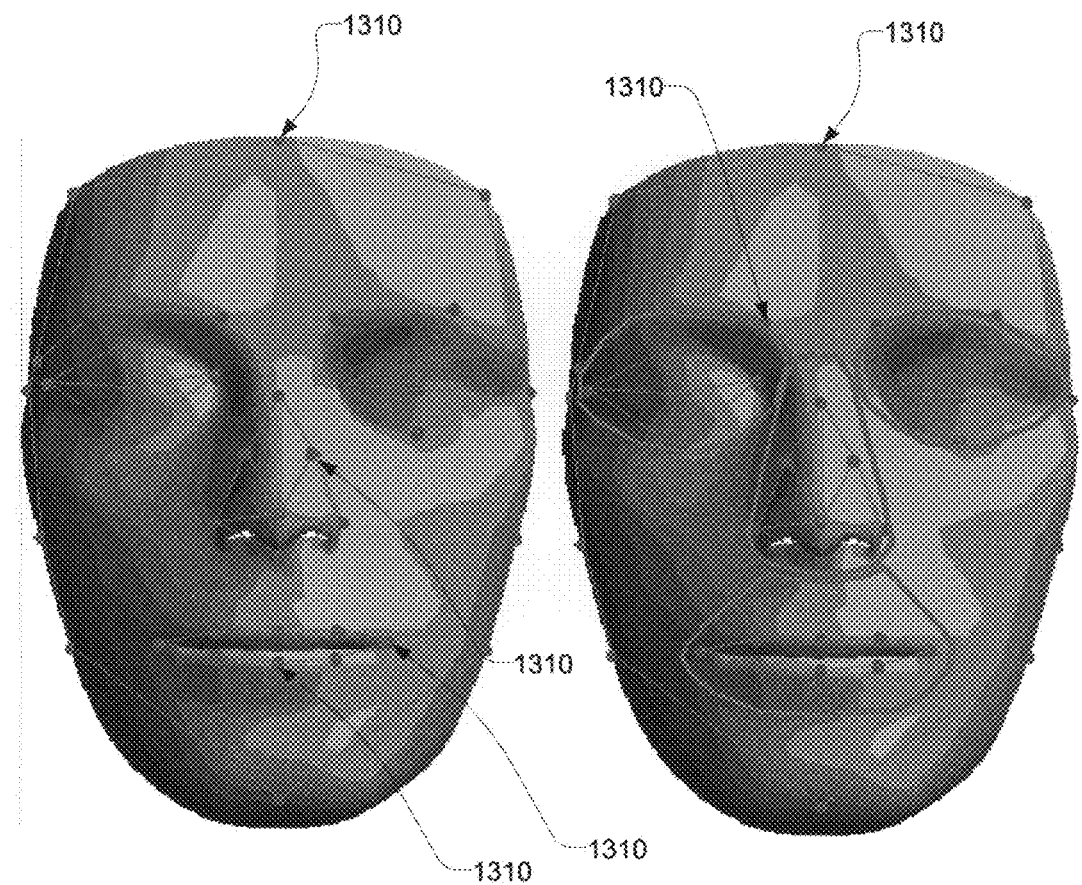
FIGS. 13A through 13B are illustrations of a three dimensional sketch artist software defined major feature points and excision contours according to one exemplary embodiment.

(features such as nose tip, mouth corners, and eyes centers) on the generic 3D face model. FIGS. 13A through 13B are illustrations of a three dimensional sketch artist software defined major feature points and excision contours according to one exemplary embodiment. The set of fiducial points (1310) are represented as dots in FIGS. 13A and 13B. More sophisticated fiducial points selection can be done using the Gabor analysis of M. Lades, et. al., "Distortion Invariant Object Recognition in the Dynamic Link Architecture." The more feature points that are selected will create a better fit for the 3D face model.

Research Seamless 3D Blending Methods

Conjoining and blending 3D surfaces is not as simple as pasting a nose or mouth onto a 2D composite sketch. 3D pasting is more critical because lighting can greatly amplify the visibility of small surface irregularities along splicing contours.

With a rich inventory of eigen-noses, eigen-lips, eigen-eyes, etc. which have been excised from real 3D faces, the present system and method requires techniques for seamlessly blending (i.e. stitching) the edges of the eigenfeatures onto the holes where previous eigenfeatures have been removed. This may be actually a more difficult problem than automatic excision, since there exists two edges, each being slightly dissimilar to the other.

If great care is not taken to assure a smooth splice, then discontinuities at the splice locations are observed when various lighting models are employed. This is a serious problem in 3D surface blending that is not present when building composite sketches in 2D photographs. It is important that the splice edges of both surfaces have similar contour shapes and similar first and second derivatives.

Alternatively, if care is taken in selecting appropriate splice contours, then the splice will be less sensitive to these effects. Possible splice contours might be along locations of high surface curvature. Edges are normally observed at these locations, so the presence of an edge artifact might not be easily seen. Various algorithms are able to deal with these issues.

Developing a Brush for Texture and Skin Tone Manipulation

Figure 14:
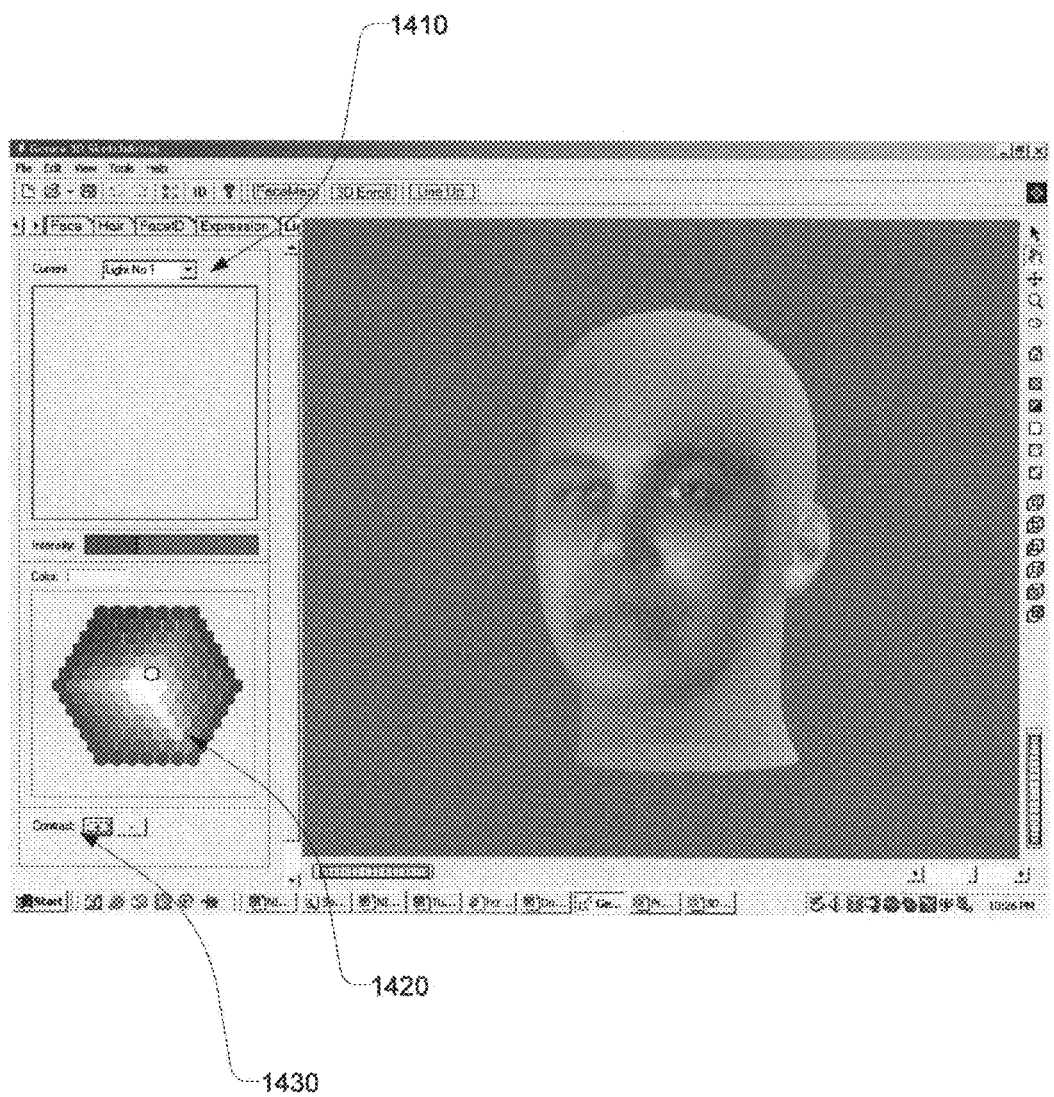
FIG. 14 is yet another illustration of a screen shot of a user interface of a three dimensional sketch artist software process depicting a texture brush, and color and contrast manipulation interface according to one exemplary embodiment.

Skin texture is important to realistic face sketching. The present system and method's approach to modifying skin texture is to provide the user with a simple means of changing the color and shadowing of each local eigenfeature. The challenge is to change the color while maintaining proper blending with adjacent local eigenfeatures for consistency. FIG. 14 is yet another illustration of a screen shot of a user interface of a three dimensional sketch artist software process depicting a texture brush and color and contrast manipulation interface according to one exemplary embodiment. A user may manipulate the texture of the 3D image using a texture brush (1410). The user can also manipulate the color and contrast using the color manipulation interface (1420) and the contrast manipulation interface (1430).

Skin, Bone and Muscle

The basic head shape is dictated by the skull. Face shape is based on rigid, flexible, and semi-flexible components. The rigid part is due primarily to the skull and jaw which form the foundation upon which muscles and skin together form the external visible appearance. Semi-flexible cartilage on the nose and ear reveal their physical properties via increased sagging with age.

Figure 15:
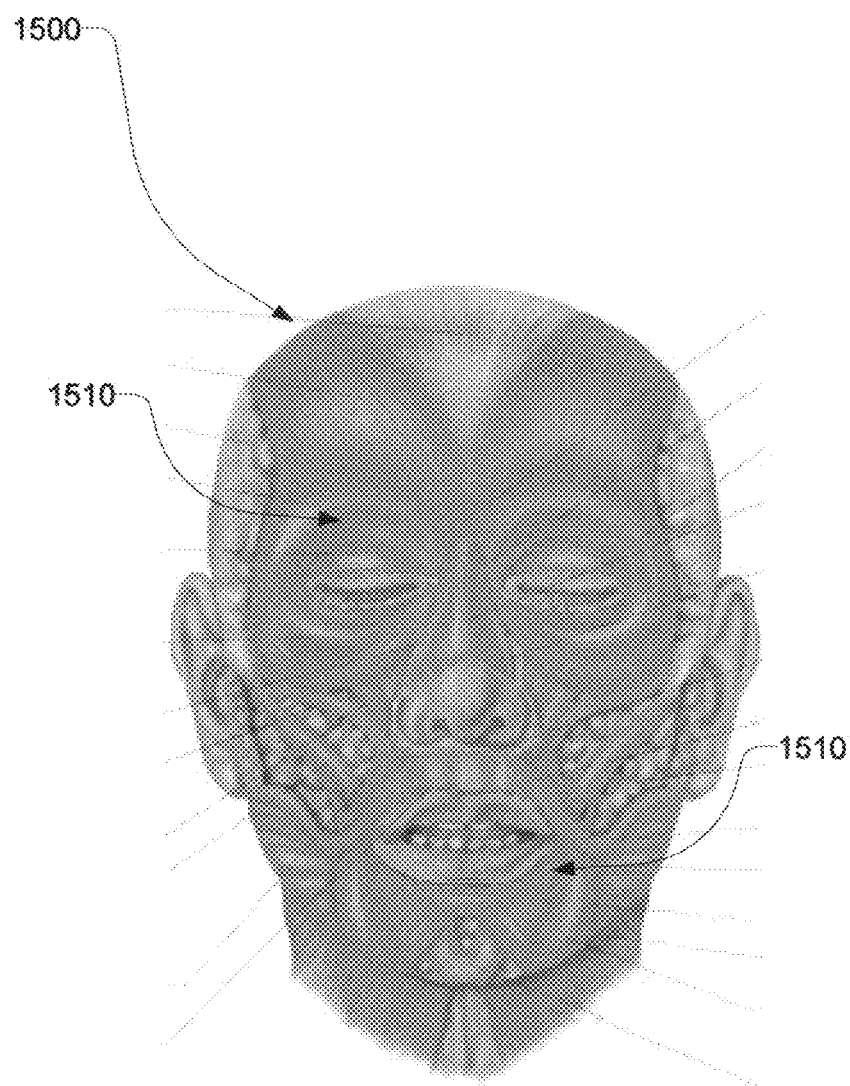
FIG. 15 is an anatomical illustration of the facial muscles of a human.

A true model of facial morphing must to take into account physical properties of skin and muscle. FIG. 15 is an anatomical illustration of the facial muscles of a human. There are approximately 27 muscles (1500) in the face with three connection types. Some of these muscles (1500) connect to bone on one end and to skin on the other end, and produce gross effects due to anchoring of the source. Other muscles (1500) connect skin to skin, exemplified by the muscles located around the mouth called the orbiculus oris (1510) and the muscles located around the eye called the orbiculus oculi (1520). These muscles modulate skin shape such as lip puckering and eye squinting. Finally, there are muscles which connect bone to muscle. A good example is the smiling muscles connected to the orbicular oris (1510), which cause smiling and frowning.

Skin is best modeled as a three dimensional structure. Various layers include the epidermis, endodermis, and fat. A recent thesis taking into account the various layers of skin, musculature, and skull shape is described in ZhangYu's, "3-D Human Face Modeling for Dynamic Facial Expression Synthesis" of the School of Electrical and Electronic Engineering at the Nanyang Technological University in Singapore. A spin-off of this level of detail is the ability to render weight gain and weight loss from fat in the skin. Current 3D facial models do not model this effect very well.

Developing Life-Like 3D Hair

One of the most significant challenges of development of the 3D sketch artist software is the development of 3D hair that can grow, trim, and style realistically. Hair has been communicated as the critical feature that witnesses remember the most and the largest limitation of current 2D facial sketching tools. In fact, many law enforcement professionals state that they routinely export the hair from these 2D-based sketching tools to another program where they enhance the hair and then import the hair back. This is both time consuming and extremely inefficient.

Figure 16:
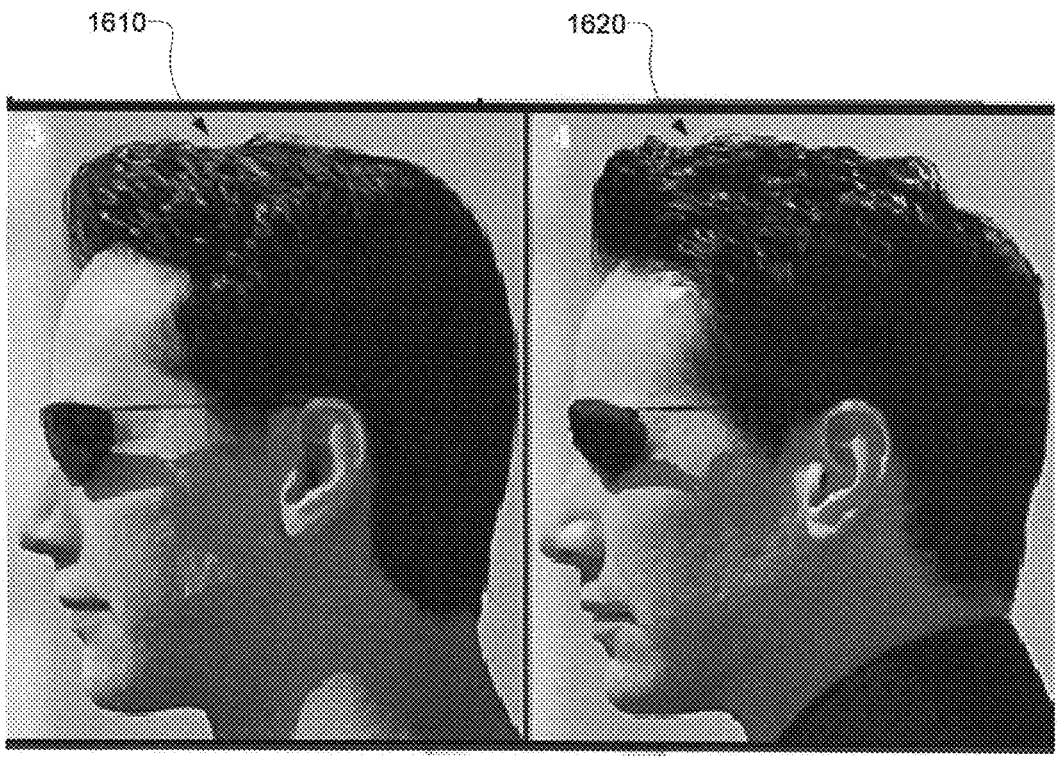
FIG. 16 is an illustration depicting how a three dimensional sketch artist software process renders hair according to one exemplary embodiment.

The present system and method focuses several resources on the development of realistic 3D hair in effort to solve this difficult problem. The present system and method's approach is to leverage recent advances from Hollywood in the making of 3D hair for the film industry. FIG. 16 is an illustration depicting how a three dimensional sketch artist software process renders hair according to one exemplary embodiment. Advancements where made in the area of life-like 3D hair during the filming of the popular science-fiction movie, "The Matrix Reloaded." The first image (1610) on the left displays generated 3D hair and the second image (1620) on the right is an actual photograph of the actor Keanu Reeves. This shows the potential of producing realistic 3D hair.

Several issues that must be addressed in the development of realistic 3D hair include 3D hair model generation, 3D hair style (morphable models that can grow, trim, or change style), texture manipulation, computational efficiency, lighting and shadow modeling, and 3D hair model generation.

The first step is to determine the hair morphable model rendering to support a variety of hair styles. The present system and method's approach is similar to the 3D local eigenfeature approach described above that provides the process with flexibility and processing efficiency of both the shape and texture of facial features. The morphable hair models are segmented into partitions, where each area of the head is a local eigen-hair model. For example, hair on the sides will be distinct and separate from that on top of the head and the back of the head. However, the hairs can all blend to form a natural 3D and 2D texture look and feel.

Figure 17:
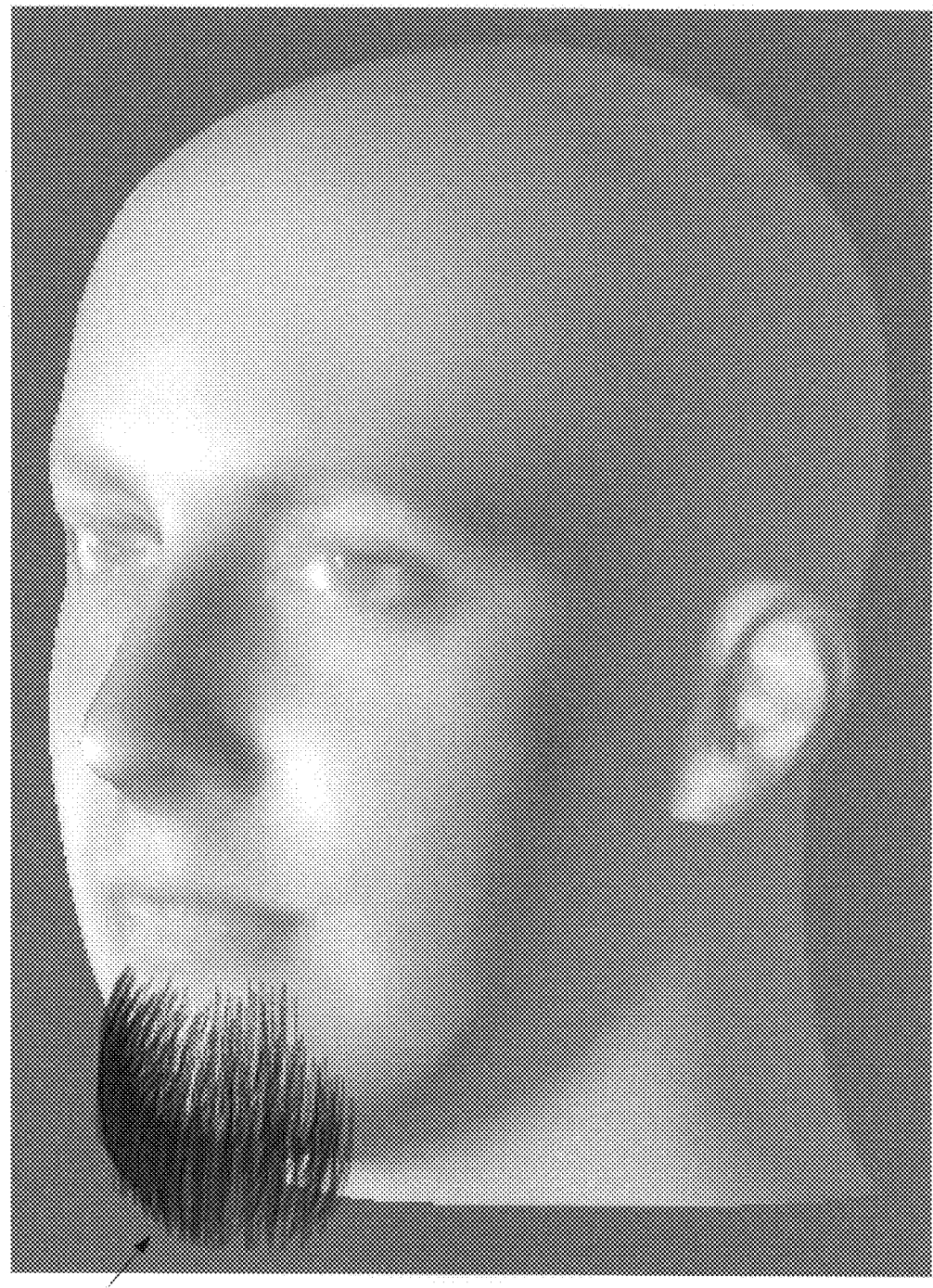
FIG. 17 is an illustration depicting how a three dimensional sketch artist software process renders facial hair according to one exemplary embodiment.
Figure 18A:
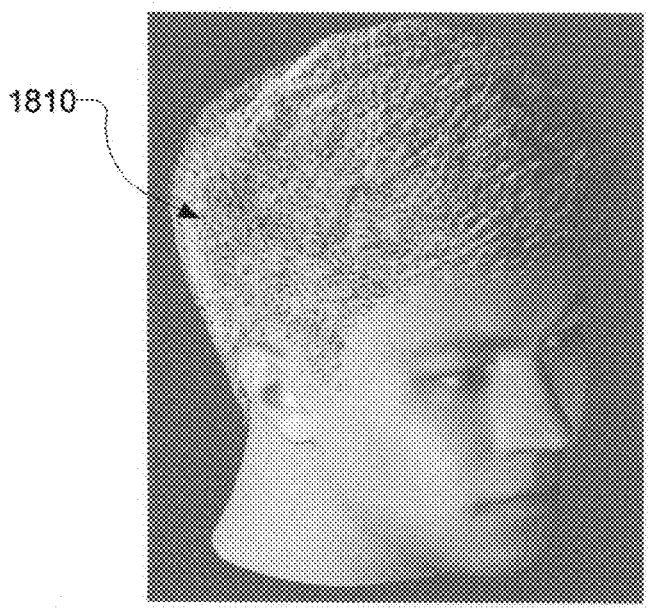
FIGS. 18A through 18D are illustrations depicting how three dimensional sketch artist software renders hair according to one exemplary embodiment.
Figure 18B:
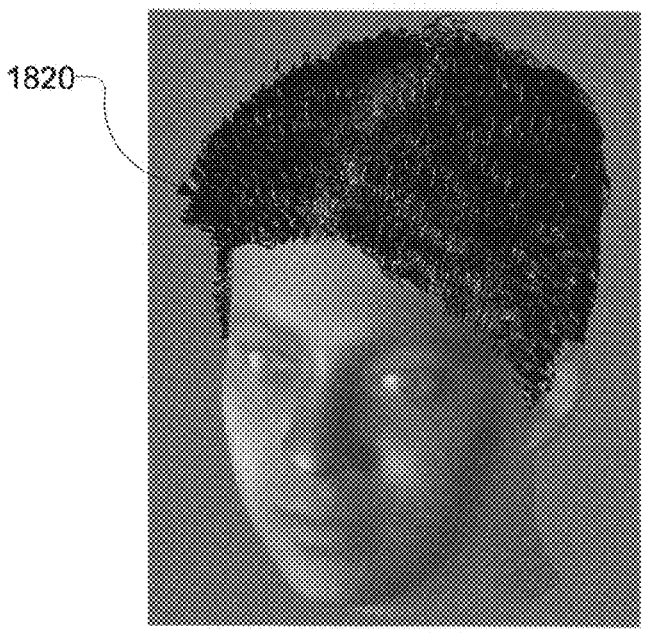
Figure 18C:
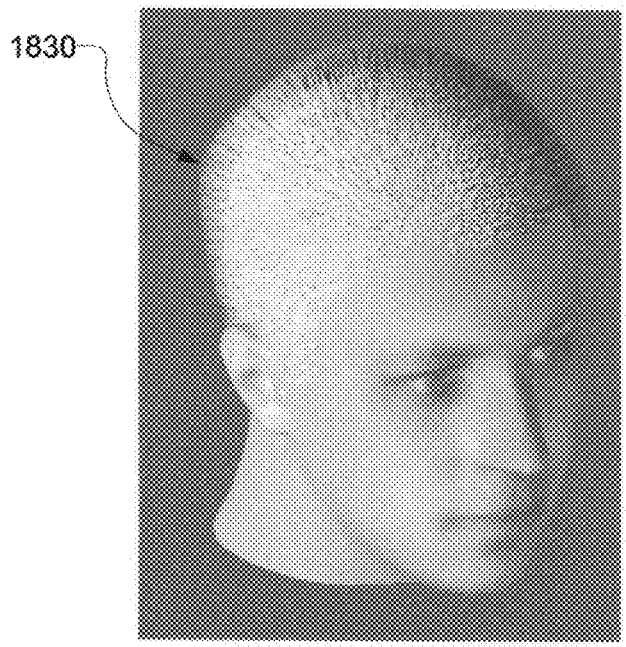
Figure 18D:
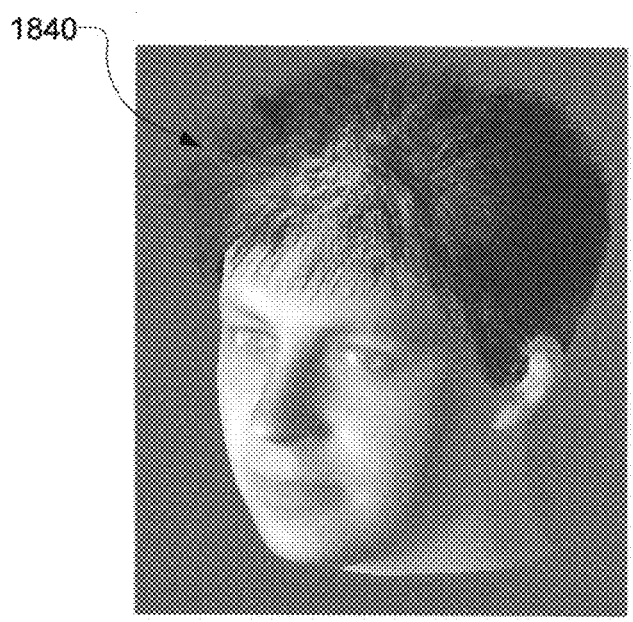

Various areas of the face are also separate and distinct hair models. However, all of the hair models can be easily linked together to provide a uniform change in length and style. In this way, any hair style can be achieved including a shaved head on only one side of the head or a complete increase in all of the hair groupings, such as that which is needed to create a beard. Each hair can be generated using consecutive cylinders for the hairs. Each hair can correlate with one another for computational efficiency when morphing. FIG. 17 is an illustration depicting how a three dimensional sketch artist software process renders facial hair according to one exemplary embodiment. The facial hair (1710), as described above, has been grouped and modified uniformly to create the appearance of a trimmed beard.

3D Hair Style

Similar to the local facial eigenfeatures, local eigen-hair models can be grouped together with specific grab points and morphing functions defined for each movement of the mouse, graphical scroll bars, and/or keystrokes. A user can grab a section of the hair and, depending on the movement of the mouse, change the hair style, length, thickness, and/or curvature. FIGS. 18A through 18D are illustrations depicting how three dimensional sketch artist software renders hair according to one exemplary embodiment. The 3D sketch artist software is able to render several types of hair styles including, but not limited to, a general short hair style (1810), or a spike hair style (1830). The present system and method can also support all types of hair, including, but not limited to curly hair (1820) or straight hair (1840).

Develop Realistic 3D Accessories

The present system and method also provides a variety of realistic 3D hats, glasses, jewelry and other decoration models using a 3D camera and/or manufacturers' CAD models as a basis. Ray tracing techniques for rendering metal, translucency, cloth, and reflection can be used. 3D accessories can be sizeable by a GUI control so as to be fitted to a face. The present system and method also provides the ability to change color, patterns, and designs to reflect the realism demanded by law enforcement.

In conclusion, the present system and method provides a computer automated 3D sketch artist process for generating a computer 3D like picture of crime suspects from witness descriptions. The 3D sketch artist process allows the user to morph several eigenfeatures of the 3D sketch.

The preceding description has been presented only to illustrate and describe embodiments of the system and method. It is not intended to be exhaustive or to limit the system and method to any precise form disclosed. Many modifications and variations are possible in light of the above teaching.

What is claimed is:

1. A process for generating a three-dimensional image of an individual comprising:
   on a user interface of a computer, generating a morphable head model composed of a number of local eigenfeatures, and
   with said user interface, manipulating any of said local eigenfeatures to selectively modify said head model to better conform to said individuals,
   in which manipulating any of said local eigenfeatures includes ensuring that splice edges of a number of adjacent eigenfeatures have similar contour shapes and similar first and second derivatives.

2. The process of claim 1, in which manipulating any of said local eigenfeatures further comprises selecting a replacement eigenfeature from a database, in which the replacement eigenfeature is used in said head model in place of a selected eigenfeature.

3. The process of claim 1, in which each of said local eigenfeatures comprises a grab point and said manipulating any of said local eigenfeature further comprises selecting and relocating said grab point.

4. The process of claim 1, in which manipulating any of said local eigenfeatures further comprises selectively modifying eigenfeatures according to a pose or expression of said individual.

5. The process of claim 1, in which manipulating any of said local eigenfeatures further comprises changing a color or shadowing of that local eigenfeature.

6. The process of claim 1, in which said local eigenfeatures are prepared based on models of real corresponding human features.

7. A computerized system for rendering a three-dimensional (3D) sketch in accordance with a witness's description comprising:
   a central processing unit,
   a first selectively addressable memory for storing at least one human head model that is composed of a number of local eigenfeatures,
   a second selectively addressable memory for storing a number of local eigenfeatures,
   logic means for addressing said first and said second memory units to assemble said 3D sketch of an individual,
   logic means for individually altering or replacing said local eigenfeatures to generate a modified sketch,
   and display means driven by said central processing unit to display one or more 3D sketches corresponding to said individual,
   in which said logic means for individually altering or replacing said local eigenfeatures is configured to ensure that splice edges of a number of adjacent eigenfeatures have matching contour shapes and matching first and second derivatives.

8. The computerized system of claim 7, additionally comprising logic control means for selectively altering at least one of said eigenfeatures including, but not limited to, the pose, lighting, expressions, texture or shading of said individual's sketch.

9. The computerized system of claim 7, additionally comprising logic control means for morphing a plurality of said eigenfeatures mathematically to describe facial muscle movements.

10. The computerized system of claim 7, additionally comprising logic means for selectively modifying said individual's sketch by altering a plurality of said eigenfeatures to manipulate features including, but not limited to, the pose, lighting, expressions, texture or shading of said individual's sketch.

11. The computerized system of claim 7, additionally including facial recognition logic for comparing said first sketch with a plurality of prerecorded sketches based upon 3D measurement data.

12. The computerized system of claim 7, wherein said computerized system includes, but is not limited to, a desktop computer, a laptop computer, a personal digital assistant, or a cellular phone.

13. A computerized system for generating a three-dimensional image of an individual comprising:
   a processor configured for generating a morphable head model composed of a plurality of local eigenfeatures, and
   a user interface for viewing said head model and manipulating any of said local eigenfeatures individually to selectively modify said head model to better conform to said individual,
   in which each of said local eigenfeatures comprises a grab point such that said user interface is configured to manipulate any of said local eigenfeature by selecting and relocating said grab point for that local eigenfeature.

14. The system of claim 13, further comprising a database of local eigenfeatures accessible to said processor, in which manipulating any of said local eigenfeatures comprises selecting a replacement eigenfeature from said database, where the replacement eigenfeature is used by said processor in said head model in place of a selected eigenfeature.

15. The system of claim 13, in which said processor is further configured to selectively modify said local eigenfeatures according to a desired pose or expression of said individual.

16. The system of claim 13, in which said processor is further configured to selective change a color or shadowing of a selected local eigenfeature in response to user input with said user interface.

17. The system of claim 13, in which said local eigenfeatures are prepared based on models of real corresponding human features.

18. The process of claim 1, in which manipulating any of said local eigenfeatures further comprises selecting splice contours along locations of high surface curvature.

19. The computerized system of claim 7, in which said logic means for individually altering or replacing said local eigenfeatures is further configured to ensure that splice edges of a number of adjacent eigenfeatures have matching contour shapes and matching first and second derivatives.

* * * * *